United States Patent [19]
Kasai

[11] Patent Number: 5,147,144
[45] Date of Patent: Sep. 15, 1992

[54] HOLLOW SHAFT

[75] Inventor: Makoto Kasai, Maebashi, Japan

[73] Assignee: Mitsuba Electric Manufacturing Co. Ltd., Gunma, Japan

[21] Appl. No.: 718,339

[22] Filed: Jun. 19, 1991

[30] Foreign Application Priority Data

Jun. 20, 1990 [JP] Japan ................. 2-65389[U]

[51] Int. Cl.$^5$ .......................... F16B 3/04; F16C 3/02
[52] U.S. Cl. .................................. 403/259; 403/261; 403/356; 384/585; 384/540
[58] Field of Search ............... 403/261, 259, 256, 355, 403/356, 360, 16, 320; 384/585, 584, 537, 540, 903, 906

[56] References Cited

U.S. PATENT DOCUMENTS 2,887,891  5/1959  Perez ................. 403/356 X

FOREIGN PATENT DOCUMENTS 866836  5/1961  United Kingdom ............... 384/537

Primary Examiner—Randolph A. Reese
Assistant Examiner—Harry C. Kim
Attorney, Agent, or Firm—McGlew & Tuttle

[57] ABSTRACT

A hollow shaft in which an externally threaded portion is forced on an outer periphery of an opening portion at one end of a main body and an engageable groove engageable with a tongue piece of a washer for a bearing is recessedly provided in the axial direction in the externally threaded portion. The engageable groove is recessedly provided to define a remaining wall portion at an outer end of the hollow shaft in the axial direction, whereby a reinforcing ring portion is integrally formed at an outer end portion of the externally threaded portion in the axial direction, the width of the remaining wall portion being set at such a dimension that the washer for the bearing can be coupled into the externally threaded portion.

5 Claims, 4 Drawing Sheets

HOLLOW SHAFT

BACKGROUND OF THE INVENTION

1. Field of the Invention

This invention relates to a hollow shaft, and more particularly to a hollow shaft wherein an externally threaded portion is formed on the outer periphery of an opening portion at an end of a main body thereof, and, for example, to a hollow shaft effectively used as a motor shaft.

2. Related Art Statement

In a construction, in which the hollow shaft is rotatably supported by a motor housing, an externally threaded portion is formed on the outer periphery of an opening at an end of a main body of the hollow shaft and a nut is threadably coupled to this externally threaded portion, to thereby clamp a ball and roller bearing.

As described above, when the ball and roller bearing is clamped to an end portion of the shaft by the nut threadably coupled to the externally threaded portion of the shaft, in order to prevent the spontaneous loosening phenomenon of the nut, a washer for a ball and roller bearing (hereinafter referred to as "a washer for a bearing") is used. Namely, engageable grooves are previously cuttingly formed in the axial direction on the outer peripheries of the externally threaded portion and the nut of the shaft, respectively. The ball and roller bearing is coupled onto the shaft, and thereafter, the washer for the bearing is coupled onto the externally threaded portion while a tongue piece of the washer is inserted into the engageable groove of the externally threaded portion. Subsequently, the nut is threadably coupled onto the externally threaded portion, whereby the ball and roller bearing is clamped by the nut, interposing therebetween the washer for the bearing. Subsequently, a tooth of the washer is engaged with the engageable groove of the nut. In this state, the nut is locked against rotating about the shaft via the washer, so that the nut is reliably prevented from being loosened.

However, in the case that the above-described clamping construction is applied to the hollow shaft, when the nut is strongly clamped to the externally threaded portion, stress is concentrated at the engageable groove formed in the externally threaded portion, whereby the engageable groove shrinks inwardly in the radial direction, so that, the externally threaded portion of this hollow shaft is reduced in diameter and the meshing engagement between the nut and the externally threaded portion becomes improper. thereby unabling to obtain the desired clamping force.

An object of the present invention is to provide the hollow shaft capable of preventing the shrinking phenomenon of the externally threaded portion during clamping.

SUMMARY OF THE INVENTION

A hollow shaft according to the present invention is one in which an externally threaded portion is formed on an outer periphery of an opening portion at one end of a main body and an engageable groove engageable with a tongue piece of a washer for a bearing is recessedly provided in the axial direction in the externally threaded portion, and is characterized in that the engageable groove is recessedly provided to define a remaining wall portion at an outer end thereof in the axial direction, whereby a reinforcing ring portion is integrally formed at an outer end portion of the externally threaded portion in the axial direction, the width of the said remaining wall portion being set at such a dimension that the washer for the bearing can be coupled into the externally threaded portion.

By the above-described means, even when the nut is threadably coupled to the externally threaded portion and strongly clamped to it, the shrinking phenomenon in a portion of the engageable groove can be prevented by the remaining wall portion because the remaining wall portion is formed at the end portion of the engageable groove. In short, a force with which the opening at the end tends to reduce in diameter and be deformed, can be sustained by the reinforcing ring portion, so that the reduction in diameter and deformation of the opening at the end can be avoided.

DETAILED DESCRIPTION OF THE PREFERRED EMBODIMENTS

Figure 1:
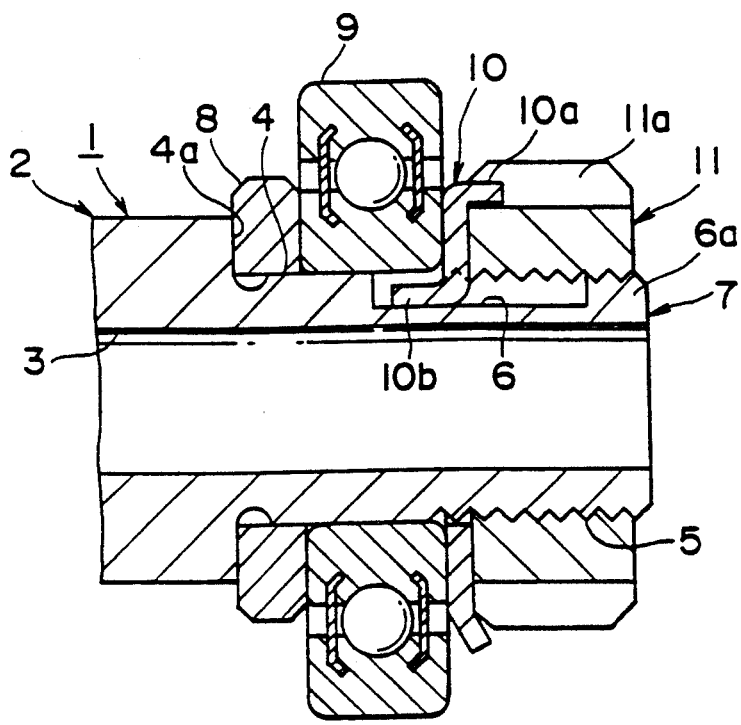
FIG. 1 is an enlarged partial side sectional view showing one embodiment of the hollow shaft according to the present invention.
Figure 2:
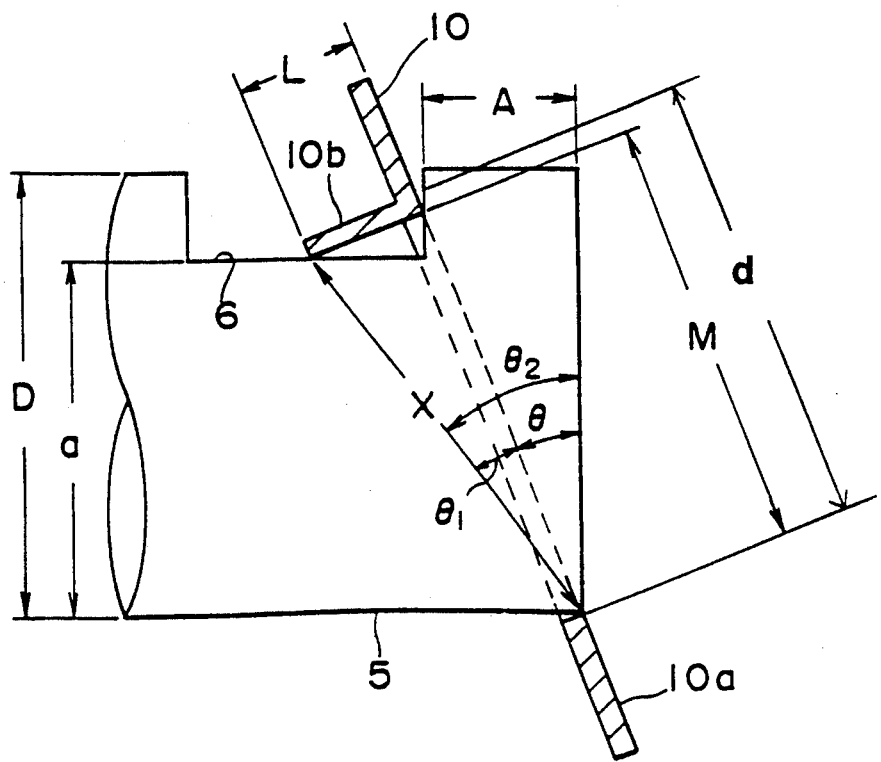
FIG. 2 is an enlarged partial side sectional view explaining the operation thereof.
Figure 3A:
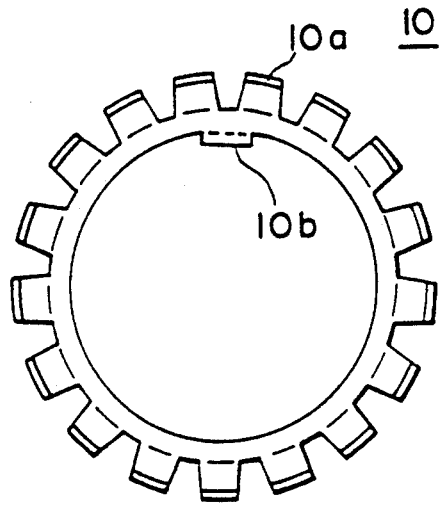
FIGS. 3(a) and 3(b) are a frontal view and a side sectional view showing the washer for the bearing.
Figure 3B:
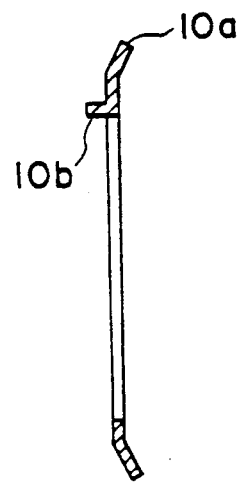
Figure 4A:
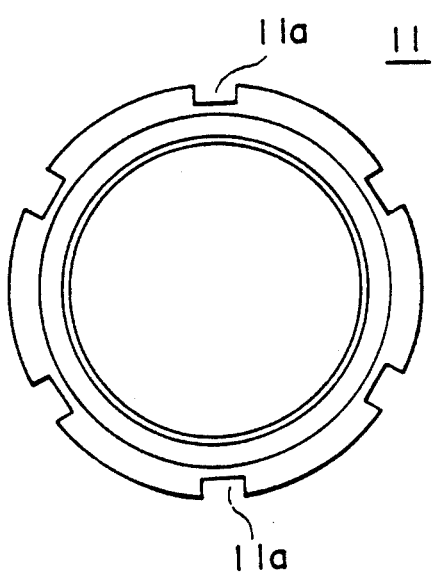
FIGS. 4(a) and 4(b) are a frontal view and a side sectional view showing the nut.
Figure 4B:
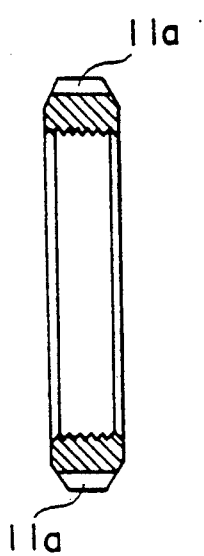
Figure 5:
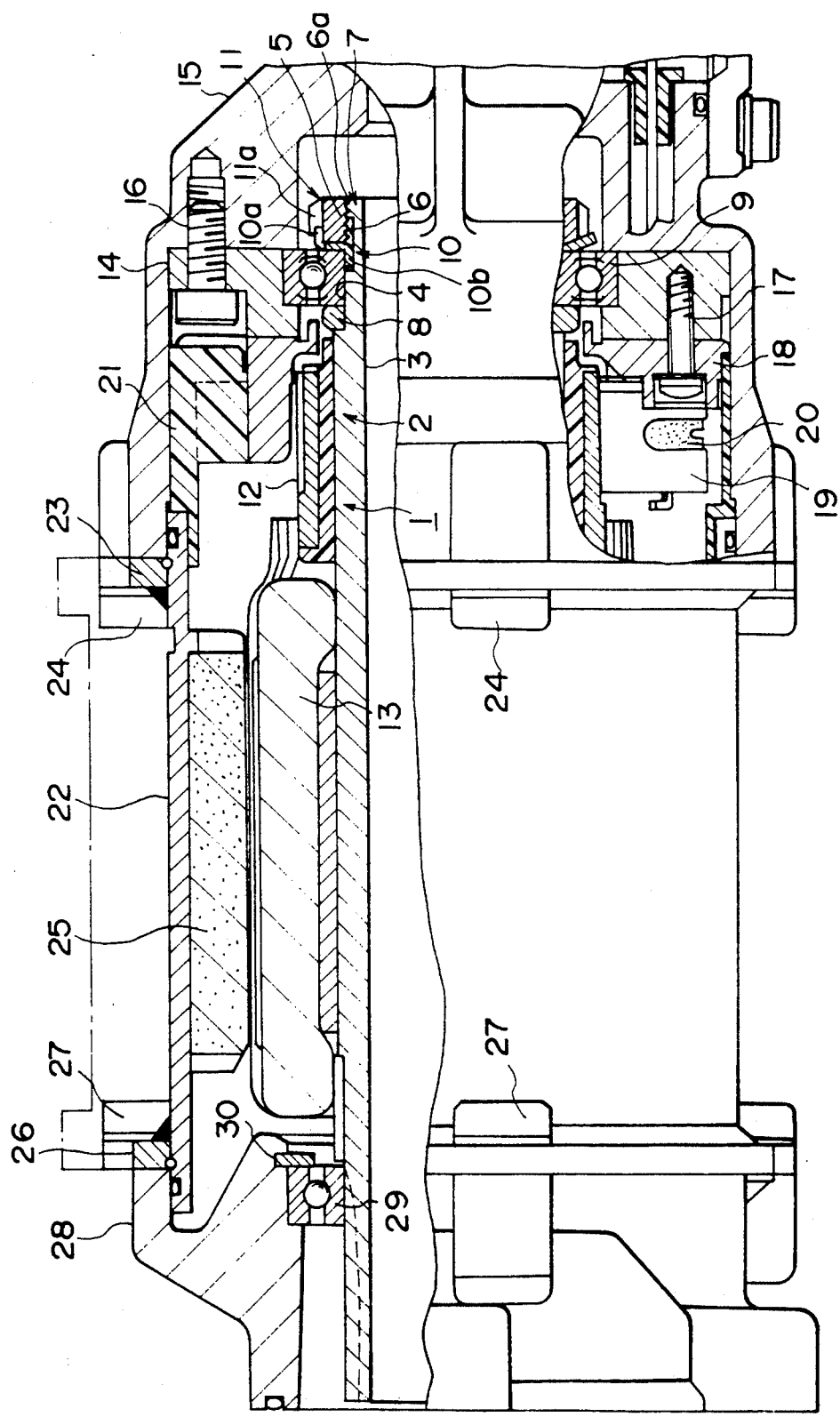
FIG. 5 is a partially cutaway side view showing the motor using the hollow shaft.

FIG. 1 is an enlarged partial side sectional view showing an embodiment of a hollow shaft according to the present invention. FIG. 2 is an enlarged partial side sectional view explaining the operation thereof. FIGS. 3(a) and 3(b) are a frontal view and a side sectional view showing a washer for a bearing. FIGS. 4(a) and 4(b) are a frontal view and a side sectional view showing a nut. FIG. 5 is a partially cutaway side view showing a motor using the hollow shaft.

In this embodiment, the hollow shaft 1 according to the present invention is used as a motor shaft in a motor. The hollow shaft 1 as being the motor shaft has a main body 2 in a cylindrical form, and a hollow portion 3 of the cylinder is inserted therethrough with a rack shaft, not shown. A mounting portion 4 for mounting a ball and roller bearing to be described hereunder, having a small diameter with predetermined width and depth is formed on the outer periphery of an end portion of the main body 2 of the hollow shaft, and an externally threaded portion 5 is notchingly provided in an outer portion in the axial direction of the mounting portion 4.

Furthermore, in a portion in the circumferential direction of the mounting portion 4, there is recessedly provided an engageable groove 6 having predetermined width and depth, extending to the vicinity of the forward end of the externally threaded portion 5, for engaging a tongue piece of a washer for a bearing to be described hereunder. Namely, the engageable groove 6 is cuttingly provided extending to the intermediate portion of the externally threaded portion 5 to define a remaining wall portion 6a at an outer end portion thereof. Accordingly, at an outer end portion in the axial direction of the externally threaded portion 5 of the main body 2 of the hollow shaft, a reinforcing ring portion 7 having predetermined width and thickness is formed to be disposed concentrically therewith and integrally projected therefrom. The thickness of the remaining wall portion 6a in the engageable groove 6, i.e. the thickness of the reinforcing ring portion 7 is preferably as large as possible from the viewpoint of improving the strength, however, when the thickness exceeds a predetermined value, the washer 10 for the bearing cannot be mounted to the externally threaded portion 5. Therefore, as shown in FIG. 2, the thickness A of the remaining wall portion 6a is set at a value satisfying an equation (5) which is obtained as follows.

$$X^2 = L^2 + M^2 \qquad (1)$$

$$\cos\theta_1 = \frac{M}{X} = \frac{M}{\sqrt{L^2 + M^2}}$$

$$\therefore \theta_1 = \cos^{-1}\frac{M}{\sqrt{L^2 + M^2}} \qquad (2)$$

$$\cos\theta_2 = \frac{a}{X} = \frac{a}{\sqrt{L^2 + M^2}}$$

$$\therefore \theta_2 = \cos^{-1}\frac{a}{\sqrt{L^2 + M^2}}$$

$$\theta = \theta_2 - \theta_1$$

$$= \cos^{-1}\frac{a}{\sqrt{L^2 + M^2}} - \cos^{-1}\frac{M}{\sqrt{L^2 + M^2}} \qquad (4)$$

$$A = < M \sin\theta$$

$$= M \cdot \sin\left(\cos^{-1}\frac{a}{\sqrt{L^2 + M^2}} - \cos^{-1}\frac{M}{\sqrt{L^2 + M^2}}\right) \qquad (5)$$

$$d = D + 0.1 \sim 2 \text{ (mm)} \qquad (6)$$
$$M = d - 1 \sim 2 \text{ (mm)} \qquad (7)$$

where

M: a value obtained by subtracting a length in the radial direction of a tongue piece 10b from the inner diameter d of the washer 10 for the bearing, L: the length in the axial direction of the tongue piece 10b, and a: a value obtained by subtracting the depth of the engageable groove 6 from the diameter D of the externally threaded portion 5.

A ball and roller bearing 9 is assembled and fixed in the following manner to the hollow shaft 1 thus constructed. Namely, first, a distance ring 8 is coupled onto the mounting portion 4 of the hollow shaft 1 as far as it abuts against a stepped portion 4a of the mounting portion 4. Subsequently, the ball and roller bearing 9 is coupled onto the mounting portion 4 as far as it abuts against the distance ring 8.

Next, the washer 10 for the bearing as shown in FIG. 3 is coupled onto the mounting portion 4 as far as it abuts against the ball and roller bearing 9. At this time, the tongue piece 10b bent substantially at a right angle toward the bearing in the axial direction on the inner periphery of the washer 10 is to be inserted into the engageable groove 6 of the mounting portion 4. As shown in FIG. 2, the tongue piece 10b is inserted into the engageable groove 6 in a state where the washer 10 for the bearing is inclined to the axial line because the remaining wall portion 6a is formed at the forward end portion of the engageable groove 6, whereby the engageable portion 6 is blocked. In this case, since the thickness A of the remaining wall portion 6a is set to satisfy the aforesaid equation (5), the washer 10 for the bearing can pass through the externally threaded portion 5 in a posture of being inclined. The insertion of the tongue piece 10b into the engageable groove 6 locks the washer 10 for the bearing against rotating about the hollow shaft 1.

Subsequently, a nut 11 is threadably coupled to the externally threaded portion 5 of the hollow shaft 1, and the ball and roller bearing 9 coupled to the mounting portion 4 from outside is clamped by the stepped portion 4a of the mounting portion 4 and the nut 11 via the distance ring 8 and the washer 10 for the bearing. As shown in FIG. 1, when the ball and roller bearing 9 is completely fixed, one of a plurality of engageable pawls 10a arranged at equal intervals in the circumferential direction and radially projecting from the outer periphery of the washer 10 for the bearing is flexed and deformed so as to be inserted into one of the engageable grooves 11a arranged at intervals in the circumferential direction and recessedly provided inwardly in the radial direction on the outer periphery of the nut 11 as shown in FIG. 4. The engagement of the engageable pawl 10a with the engageable groove 11a locks the nut 11 against rotating about the hollow shaft 1 via the washer 10 for the bearing, so that the nut 11 can be prevented from being loosened due to the rotation of the hollow shaft 1.

Figure 6:
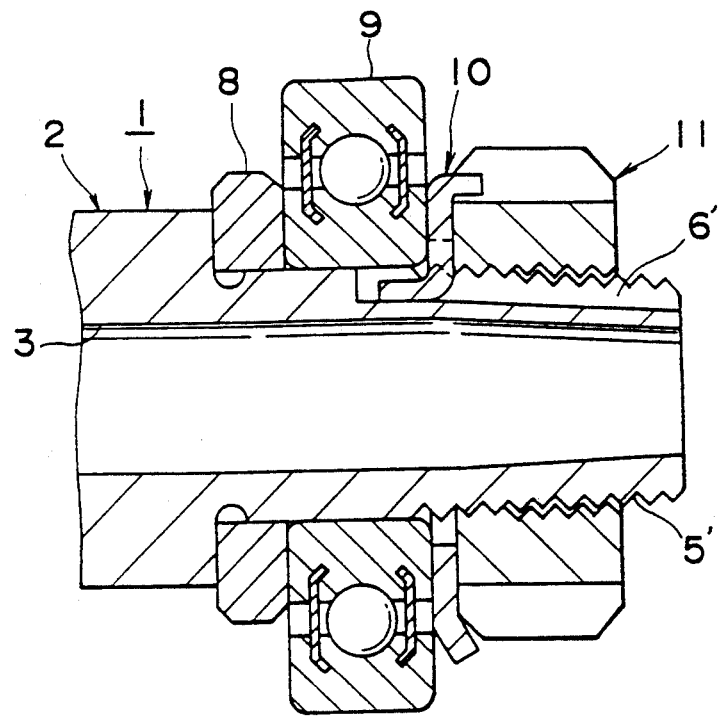
FIG. 6 is an enlarged partial side sectional view showing a comparative example.
Figure 7:
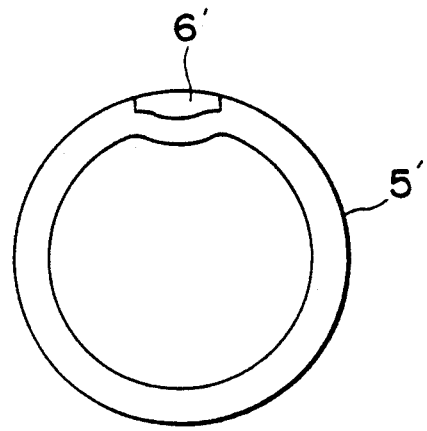
FIG. 7 is an end view showing a portion thereof.

Now, in the conventional hollow shaft where the reinforcing ring portion 7 is not formed, namely, in the case where an engageable groove 6' is cuttingly provided to open at the forward end of an externally threaded portion 5' as shown in FIG. 6, when the nut 11 is strongly clamped, stress is concentrated at the engageable groove 6', whereby a portion of the engageable groove 6' is deformed as shown in FIG. 7, so that the externally threaded portion 6' is taperedly reduced in diameter and deformed. Namely, a so-called shrinking phenomenon occurs. When the externally threaded portion 5 is taperedly reduced in diameter, screw threads of the externally threaded portion 5 and of the nut 11 do not properly mesh with each other as shown in FIG. 6, so that clamping of the ball and roller bearing 9 by the nut 11 becomes improper.

However, in the embodiment according to the invention, the remaining wall portion 6a is formed at the outer end portion of the engageable groove 6, whereby the reinforcing ring portion 7 is integrally formed on the outer end portion in the axial direction of the externally threaded portion 5 of the hollow shaft 1, so that the nut 11 can clamp strongly. Even when a force for deforming the externally threaded portion 5 inwardly in the radial direction acts on the forward end portion of the externally threaded portion 5, the acting force is sustained by the reinforcing ring portion 7, so that the externally threaded portion 5 can be prevented from being taperedly reduced in diameter.

As described above, in this embodiment, the reduction in diameter and deformation of the externally threaded portion at the time of being clamped by the nut 11 of the ball and roller bearing 9 is avoided, whereby, even when the nut 11 is clamped strongly, the engagement of the screw threads of the externally threaded portion 5 and of the nut 11 remains in the proper state. As the result, the ball and roller bearing 9 can be clamped strongly by the nut 11, so that the ball and roller bearing 9 can be reliably fixed to the hollow shaft 1.

In this embodiment, a commutator 12 and an armature 13 are successively arranged on the hollow shaft from the side of the mounting portion 4, being fixedly mounted on the outer periphery of the intermediate portion of the hollow shaft 1 as being a motor shaft, so that the commutator 12 and the armature 13 are rotatable unitedly with the hollow shaft 1. In the mounting portion 4 of the hollow shaft on which the commutator 12 and the armature 13 are fixed, the ball and roller bearing 7 is clamped by the nut 11 in the assembly work described above. At this time, a bearing holder 14 is fixedly mounted on the ball and roller bearing 9, being pressed against the outer periphery of an outer race thereof.

Then, the hollow shaft 1 is inserted into one of end brackets constituting a portion of a motor housing, from the side of the bearing holder 14 in a state where the ball and roller bearing 9, the bearing holder 14, the commutator 12 and the armature 13 are fixedly mounted thereto. Subsequently, a bolt 16 is inserted through the bearing holder 14, whereby the hollow shaft 1 is assembled to the end bracket 15 in a state of being positioned in place.

Subsequently, a brush holder stay 18 is inserted into the end bracket 15 in a state of being coupled onto the hollow shaft 1, and clamped to the bearing holder 14 by bolts 17. Fixedly mounted on this brush holder stay 18 is a brush holder 19 which holds brushes 20 being in sliding contact with the commutator 12 fixedly mounted on the hollow shaft 1. Coupled onto the outer periphery of the brush holder stay 18 is a resinous cover 21, by which the exteriors of the brush holder stay 18 and the brush holder 19 are surrounded.

Furthermore, a yoke 22 constituting a portion of the motor housing covers an opening portion of the end bracket 15 in a state of being coupled onto the hollow shaft 1. The yoke 22 is clamped to the end bracket 15 by bolts 24 at a flange portion 23 welded to the outer periphery of the yoke 22 at one end thereof. Fixedly mounted and arranged in the circumferential direction on the inner periphery of the yoke 22 are magnets 25 which are opposed to the armature 13 fixedly mounted on the hollow shaft 1.

Then, a second end bracket 28 covers an opening portion at the other end of the yoke 22. A flange portion 26 welded to the outer periphery of the yoke 22 is clamped to an end bracket 28 by bolts 27, whereby this end bracket 28 and the yoke 22 are connected to each other. A ball and roller bearing 29 is coupled into this second end bracket 28 and held by a stopper ring 30 in a state of being positioned in place, and an end portion of the hollow shaft 1 is coupled into an inner race of the ball and roller bearing 29. With this arrangement, the hollow shaft 1 is rotatably supported by the ball and roller bearings 9 and 29 arranged in the both end brackets 15 and 28.

In the motor thus assembled and constructed, when electric power is supplied to the armature 13 through the brushes 20 and the commutator 12, the magnetic lines of force of the armature 13 cross the magnetic field of the magnets 25, whereby the hollow shaft 1 is rotatably driven. By the inertial force of the rotation of this hollow shaft 1, the outer periphery of the mounting portion 4 of the hollow shaft 1 and the inner peripheral surface of the inner race of the ball and roller bearing 9 tend to be shifted relatively. However, as described above, the inner race of the ball and roller bearing 9 is strongly clamped by the nut 11, so that the relative shift between the hollow shaft 1 and the inner race of the ball and roller bearing 9 can be reliably prevented.

Furthermore, loosening of the nut 11 due to the inertial force of the rotation of the hollow shaft can be prevented by the washer 10 for the bearing and the engageable groove 6 as described above.

Incidentally, the present invention should not be limited to the above embodiment, and, it is needless to say that various modifications are possible within the scope of the invention.

For example, in the above, description has been given of the case where the inner race of the ball and roller bearing 9 is clamped to the mounting portion 4 of the hollow shaft by the nut 11, however, the present invention can be applied to the case where a body of rotation such as a fan is clamped to the hollow shaft so as to be rotatable integrally, and so forth.

As has been described hereinabove, according to the present invention, even when the nut is threadably coupled to the externally threaded portion and screwed strongly, the force which tends to reduce the diameter of the opening at one end and deform it is sustained by the reinforcing ring portion, whereby the reduction in diameter and deformation of the opening portion at one end can be prevented. As a result, an equipment or a part such as the ball and roller bearing or the fan can be reliably clamped to the hollow shaft by the strong clamping force of the nut.

What is claimed is:

1. A hollow shaft wherein an externally threaded portion is formed on an outer periphery of an opening portion at an end of a main body thereof, and an engageable groove engageable with a tongue piece of a washer for a bearing is recessedly provided in an axial direction in said externally threaded portion, characterized in that said engageable groove is recessedly provided with a remaining wall portion formed at an outer end portion thereof in the axial direction, whereby a reinforcing ring portion is integrally formed at an end portion of said externally threaded portion in the axial direction, the width of said remaining wall portion in the axial direction being set at a dimension with which said washer for a bearing can be coupled onto said externally threaded portion.

2. The hollow shaft of claim 1, wherein:
   said main body of the hollow shaft is formed in a cylindrical form; and
   a mounting portion for mounting an equipment, having a small diameter with predetermined width and depth, is formed on the outer periphery of an end portion of the main body, said externally threaded portion being formed in an outer portion in the axial direction of the mounting portion.

3. The hollow shaft of claim 2, wherein:
   said engageable groove is recessedly provided in a predetermined width and depth, extending along an intermediate portion of the externally threaded portion.

4. The hollow shaft of claim 3, wherein:
   said reinforcing ring portion is formed at an outer end portion in the axial direction of the externally threaded portion in predetermined width and thickness to be disposed concentrically and integrally projected.

5. The hollow shaft of claim 1, wherein:

a thickness A of the remaining wall portion is set to satisfy the following equations:

$$A = <M \sin\theta$$
$$= M \sin\left(\cos^{-1}\frac{a}{\sqrt{L^2 + M^2}} - \cos^{-1}\frac{M}{\sqrt{L^2 + M^2}}\right)$$
$$d = D + 0.1 \sim 2 \text{ (mm)}$$
$$M = d - 1 \sim 2 \text{ (mm)}$$

where M is a value obtained by subtracting a length of the tongue piece in the radial direction from the inner diameter of the washer for the bearing; L is a length of the tongue piece in the axial direction; and a is a value obtained by subtracting the depth of the engageable groove from a diameter D of the externally threaded portion.

* * * * *